United States Patent
Donnard

(10) Patent No.: US 7,748,509 B2
(45) Date of Patent: Jul. 6, 2010

(54) GROUND POWER SUPPLY SYSTEM FOR ELECTRIC VEHICLE

(75) Inventor: Rene Donnard, Westhoffen (FR)

(73) Assignee: Lohr Industrie, Hagenbieten (FR)

( * ) Notice: Subject to any disclaimer, the term of this patent is extended or adjusted under 35 U.S.C. 154(b) by 572 days.

(21) Appl. No.: 11/664,173

(22) PCT Filed: Sep. 21, 2005

(86) PCT No.: PCT/FR2005/002338

§ 371 (c)(1),
(2), (4) Date: May 18, 2007

(87) PCT Pub. No.: WO2006/035139

PCT Pub. Date: Apr. 6, 2006

(65) Prior Publication Data

US 2008/0105509 A1    May 8, 2008

(30) Foreign Application Priority Data

Sep. 30, 2004    (FR) .................................. 04 10356

(51) Int. Cl.
*B60M 1/00*    (2006.01)

(52) U.S. Cl. .......................... 191/25; 191/23 R; 191/30; 191/48; 104/140

(58) Field of Classification Search ................ 104/140, 104/141, 142, 143, 144, 145, 146, 139; 191/23 R, 191/24, 25, 26, 29 R, 30, 31, 32, 22 C, 48, 191/49

See application file for complete search history.

(56) References Cited

U.S. PATENT DOCUMENTS

| | | | | | |
|---|---|---|---|---|---|
| 323,675 | A | * | 8/1885 | Henderson | 191/23 R |
| 413,294 | A | * | 10/1889 | Thomson | 191/25 |
| 452,160 | A | * | 5/1891 | Blackwell | 191/23 R |
| 454,023 | A | * | 6/1891 | Blackwell | 191/23 R |
| 463,197 | A | * | 11/1891 | Love | 191/23 R |
| 483,761 | A | * | 10/1892 | Creighton | 191/24 |
| 492,737 | A | * | 2/1893 | Bates | 191/23 R |
| 502,842 | A | * | 8/1893 | Zell | 191/26 |
| 519,328 | A | * | 5/1894 | Graham | 191/28 |
| 562,796 | A | * | 6/1896 | Brandenburg | 191/20 |
| 1,010,504 | A | * | 12/1911 | Lindsley | 191/31 |
| 1,763,495 | A | * | 6/1930 | Young | 191/23 R |

(Continued)

FOREIGN PATENT DOCUMENTS

CH    598 971 A    5/1978

(Continued)

*Primary Examiner*—Mark T Le
(74) *Attorney, Agent, or Firm*—Davis & Bujold, P.L.L.C.

(57) ABSTRACT

The inventive power supply system (1) comprises a ground placed power supply device (2) provided with at least one linear supply wire (7) connected to a voltage supply, a rail (6) comprising at least one zero reset conductor strip (8) and at least one protective profile in a flat L-shaped position profile masking the conductor wire. The system also comprises an on-board current sensing device (3) comprising at least one movable sensing subassembly (38) comprising a power sliding contactor (41) and a zero volts sliding contactor (42) which are electrically connected to the vehicle load circuits and used for slidingly contacting the supply wire and the zero reset conductor strip. The invention is useful for manufacturers of public transport vehicles and the lines therefor.

36 Claims, 8 Drawing Sheets

U.S. PATENT DOCUMENTS

| | | | | |
|---|---|---|---|---|
| 3,848,712 | A | * | 11/1974 | Flodell ........................ 191/30 |
| 4,083,439 | A | * | 4/1978 | Chandler ..................... 191/31 |
| 4,129,203 | A | * | 12/1978 | Berman ....................... 191/48 |
| 5,960,717 | A | * | 10/1999 | Andre ........................ 104/139 |

FOREIGN PATENT DOCUMENTS

| | | |
|---|---|---|
| DE | 106 673 C | 3/1898 |
| DE | 176 461 C | 10/1906 |

\* cited by examiner

GROUND POWER SUPPLY SYSTEM FOR ELECTRIC VEHICLE

This application is a national stage completion of PCT/FR2005/002338 filed Sep. 21, 2005 which claims priority from French patent application serial number 04/10356 filed Sep. 30, 2004.

FIELD OF THE INVENTION

The present invention relates to a ground power supply for electric vehicles, preferably vehicles guided by a guide assembly traveling on a guide rail.

More specifically, it concerns a continuous low voltage electrical ground supply.

The electric vehicles in question are land vehicles such as road vehicles, but also railway vehicles. The invention is particularly well suited for supplying electricity to an electrically propelled self-guided public transport vehicle, either a railway vehicle or a wheeled vehicle. However, the invention is not limited to this preferred embodiment.

This type of electrically propelled or driven vehicle is conventionally supplied with electrical energy through overhead or catenary cables located above the travel tracks.

The present tendency, however, for esthetic or other reasons, consists of eliminating these overhead electrified wires and replacing them with ground level or subterranean supply systems.

Several ground supply systems for these vehicles have been proposed in the prior art. However, these systems pose a certain number of disadvantages, principally from the safety standpoint.

In actuality, these prior art systems provide high voltage electrical supply, specifically a continuous supply, which can prove to be extremely dangerous for humans if they contact the conductive elements. Furthermore, with the use of high voltage, there is an additional risk related to vagabond electrical current.

SUMMARY OF THE INVENTION

The goal of the invention is to furnish a completely safe system for the ground supply of power to electrical vehicles.

Another goal of the invention is to furnish a ground power supply that is simple and quick to position and assemble.

Yet another objective of the invention is to furnish a ground power supply that is simple to maintain.

To resolve this technical problem, the invention provides a ground power supply of electricity to a land vehicle that moves along a predetermined path, said ground power supply being a sliding contact type supply with at least one conductive element. This system comprises a device located on the ground for furnishing electrical current and a current sensing device located on the vehicle and moving along with the vehicle.

The electrical supply device of the invention is placed in a cable duct that is open at the top. It comprises at least one linear supply wire connected to an electrical voltage source, said at least one wire being placed in the cable duct laterally relative to a rail that holds at least one zero reset conductor strip. It further comprises at least one protective profile that has a generally flat L-shape surrounding and masking the linear conductor wire placed beneath it.

The on board current sensor comprises at least one movable sensor subassembly supported by a support device which circulates, within the cable duct, laterally relative to the rail. This sensor subassembly comprises a power contactor designed to form a sliding electrical contact with the supply wire and a zero volt contactor designed to form a sliding electrical contact with the zero volt reset strip, said power contactors being electrically connected to the vehicle utility circuits.

Advantageously the contact between the power contactor and the supply wire takes place below the protective profile and it is surrounded by the return of this protective profile.

Said at least one linear supply wire may preferentially be connected to a continuous electrical voltage supply.

The ground supply system of the invention thus ensures the complete safety of pedestrians or others using the street.

In addition, the placement and maintenance of this supply system are especially simple.

Advantageously, the system according to the invention may comprise a supplemental safety device in case a problem arises that would jeopardize safety, consisting of a means for disconnecting the at least one subassembly sensor that is displaced within the cable duct, which allows the support assembly, which is no longer live, to be extracted while on line.

According to a preferred embodiment of the invention, the electrical current supply device may comprise two linear supply wires each connected to an electrical voltage source, said two wires being placed in the cable duct on either side of a central rail that supports two zero reset conductor strips. It also comprises two flat L-shaped protective profiles, each of said protective profiles surrounding and masking one of the conductive wires placed beneath it.

According to this variation the on-board current sensor device comprises two movable sensor subassemblies held by a support device, which circulate within the cable duct on either side of the central rail, each of said sensor subassemblies comprising a power contactor designed to form a sliding electrical contact with the corresponding supply line and a zero volt contactor designed to form a sliding electrical contact with the corresponding zero reset conductor strip, said power contactors and zero volt contactors being electrically connected to the utility circuits of the vehicle.

Advantageously, the contact between each power contactor and the corresponding supply wire may then occur below the corresponding protective profile and may be surrounded by the return of this protective profile.

Preferably the two linear supply wires may each be connected to a continuous low voltage source, one positive and the other negative, for example, and of equal value.

BRIEF DESCRIPTION OF THE DRAWINGS

Other characteristics and advantages of the invention will become apparent from reading the following detailed description in conjunction with the attached drawings, in which:

FIG. 3 represents a central rail;

FIG. 4 represents a central rail mounted in a cable duct and cooperating with the guide assembly of the sensor arm or of the vehicle;

FIG. 5 represents a cross piece to which a central rail is attached, as well as one of the side profiles, including its protective profile;

FIG. 6 represents a support bracket for a conductor wire;

FIG. 7 represents a portion of a side profile to which a bracket is attached supporting a conductor wire and a protective profile;

FIG. 8 is similar to FIG. 7 but illustrates another variation of a linear supply wire;

DETAILED DESCRIPTION OF THE PREFERRED EMBODIMENTS

Figure 1:
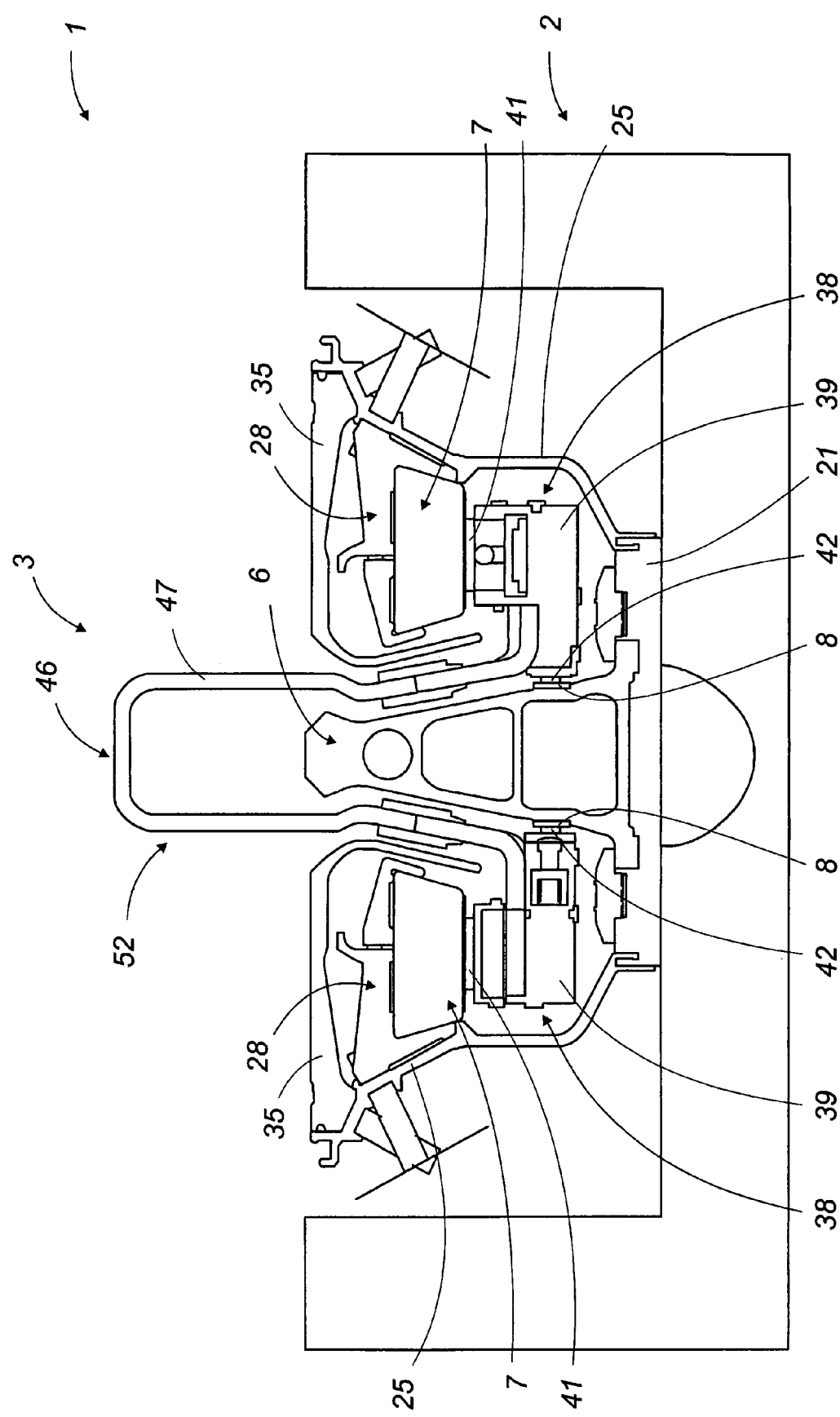
FIG. 1 is a transverse cross-section of one example of the entire electrical supply system, according to the invention, comprising a ground current supply device and an on-board sensor.

The electrical supply system, according to the present invention, will now be described in detailed fashion with reference to FIGS. 1 through 12. Equivalent elements shown in different drawings will bear the same reference numerals.

The different drawings and the associated detailed description that follows concern a particular embodiment of the invention with two supply wires, two zero volt reset conductor strips and two sensor subassemblies. However, it should be noted that this sets forth only one preferred example of the invention and it is in no way limiting.

As previously mentioned, although not shown, the supply system of the invention may comprise only one supply wire, only one zero volt reset conductor strip and only one sensor subassembly.

In the same way the voltage supply to the one or more supply wires may be any type and value.

It is possible, but not obligatory, to have continuous electrical voltage, high drive voltage, low safety voltage or the like.

A high drive voltage generally used is of the order of 750 volts.

Low safety voltage means a voltage lower than or equal to 60 volts for each polarity. These voltages are safety voltages, that is, non-lethal and not physically dangerous to humans.

The electrical supply system 1 of the invention is formed of two complementary devices that cooperate to form a ground supply of electricity to utility circuits on board an electric vehicle moving along a predetermined course.

It is formed of an electric current supply device 2 located on the ground and a current sensor device 3 on the vehicle and moving with the vehicle, which will be described in succession for the preferred variation that is shown.

Figure 2:
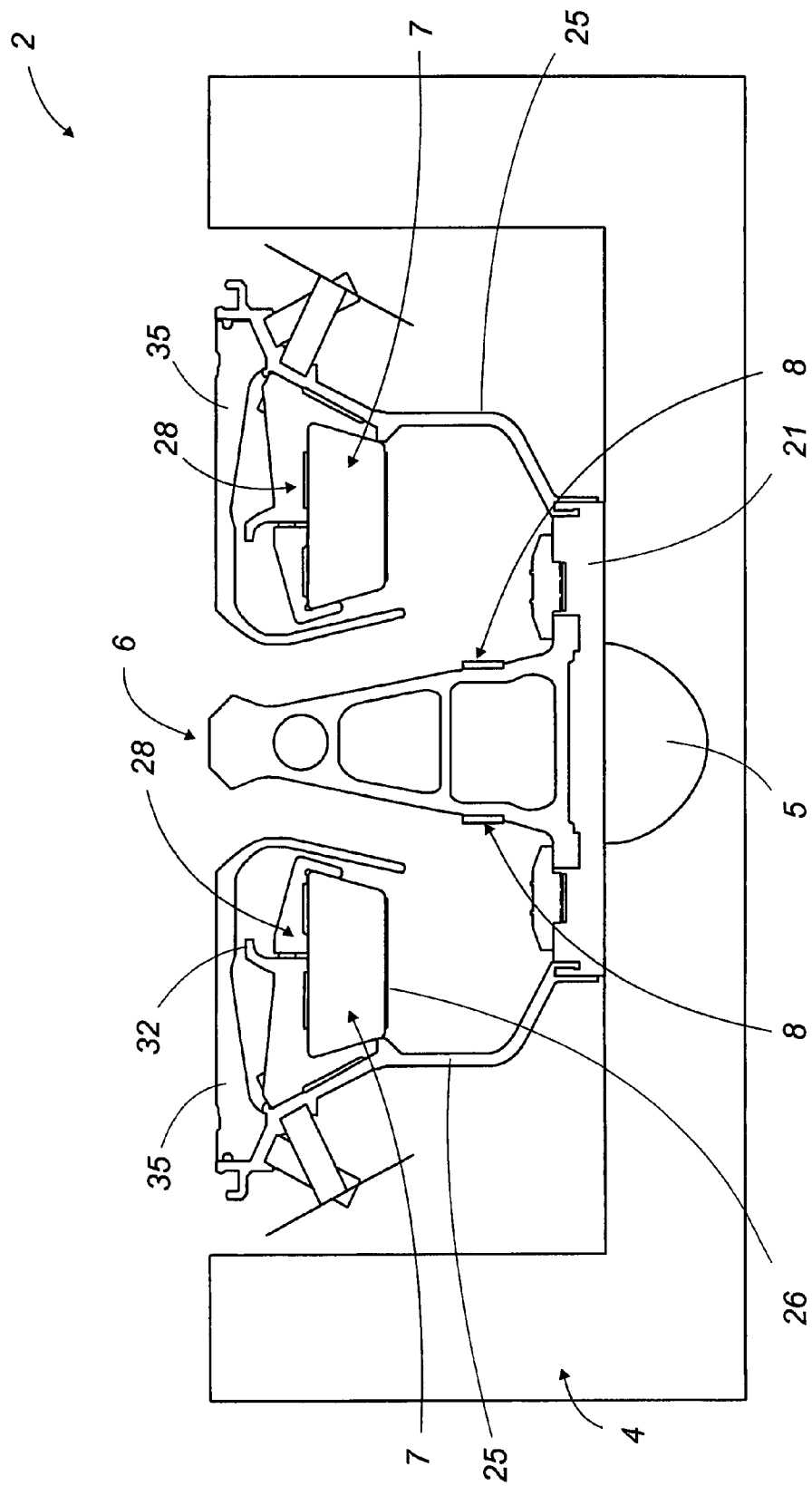
FIG. 2 is a transverse cross-section of the current supply device installed in the ground corresponding to the exemplary embodiment of the invention illustrated in FIG. 1.
Figure 3:
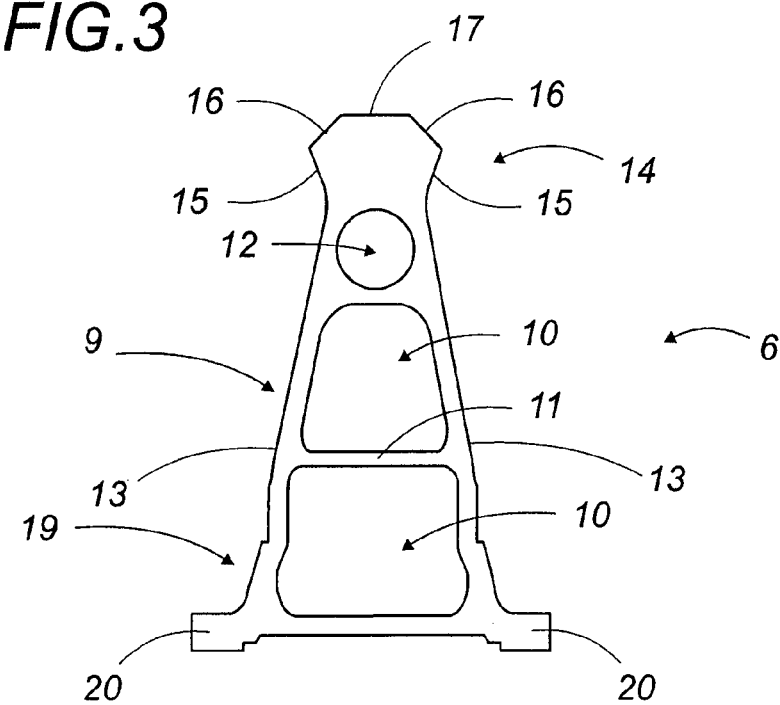
FIGS. 3 through 8 are transverse cross-sections illustrating embodiments of the principal elements constituting an electrical supply device installed in the ground according to the invention, said elements being shown either alone or in association with a few other elements.
Figure 5:
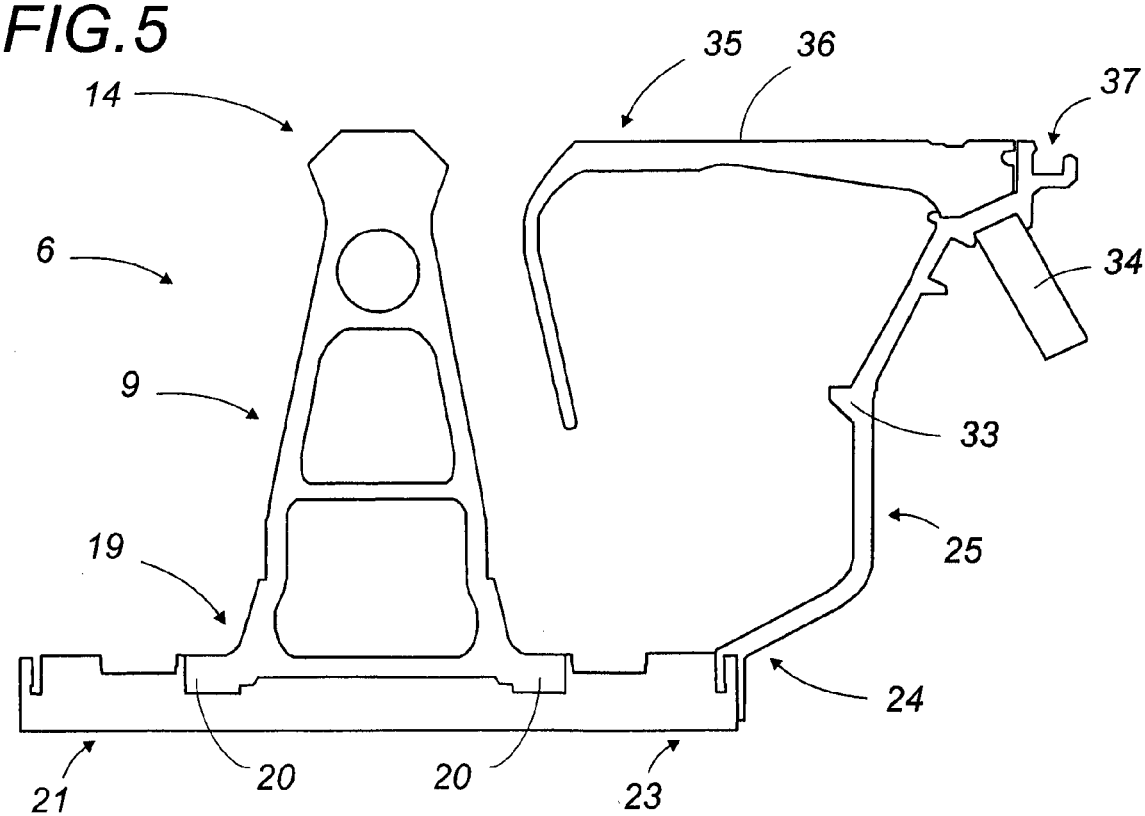

The current supply device 2 is shown by itself in FIG. 2.

This device is contained within a cable duct 4 preferably made of concrete, generally rectangular in section and open at the upper surface.

This cable duct 4 is designed to be placed inside a trench and immobilized inside it using a suitable fill. The height of the trench is preferably selected so that the top of the cable duct is essentially level with the surface of the ground. Concrete cable duct 4 may extend beyond the surface of the ground, however. In certain cases it may not even be buried, but simply placed and immobilized on a preexisting finished ground, for example, a road.

To evacuate water that may infiltrate cable duct 4, the inside area is drained by a central collecting line 5 and two gutters, not shown, running along and bordering the edges of the cable duct. Pipes or conduits then evacuate the water that has collected to a manhole and then to a gutter.

The ground electrical supply device 2, in the variation shown, is composed principally of a rail 6, preferably a central rail, and two linear supply wires 7 each connected to a voltage source that is preferably continuous in the form of two symmetrical supply subassemblies, one positive and one negative.

The electrical energy comes from a network, after being transformed and rectified in distribution stations and substations, to reach a fixed voltage supply, in the preferred example that is described as +60 volts and −60 volts.

The zero electrical reset takes place along rail 6, preferably a central rail, which has two zero volt reset conductor strips 8, for this purpose, that are preferably symmetrical.

Rail 6 may function uniquely as a support for the zero volt reset strip or strips 8. Preferably, however, it may also be a guide rail, although the invention remains valid even if it does not function as a guide rail.

Advantageously rail 6 may be made of electrically insulating and mechanically resistant material, preferably through extrusion. Several current methods can produce pieces with maximum resistance in the extrusion direction using reinforcing fibers, if necessary.

It is also possible to use a metal rail 6 because the rail has nil electrical potential and thus poses no danger to people.

In the preferred embodiment shown, rail 6 has a body 9 with a generally triangular section.

To economize material while still ensuring satisfactory resistance against lateral stress, body 9 of rail 6 is shaped like a hollow case and supports two generally trapezoidal superimposed cases 10, separated by a wall 11 and surmounted by cylindrical cavity 12.

According to an essential characteristic of the invention, rail 6 supports on at least one of its lateral walls 13, but preferably on each of them, a zero volt reset conductor strip 8 preferably made of steel. Strips 8 are preferably symmetrical and generally vertical, as shown in the different drawings.

Rail body 9 extends upward into a full rail head 14, also called a mushroom. In the example shown, it has a generally trapezoidal section with two angled lower sides 15 diverging upward, two angled contact surfaces 16 joined at the upper portion by a table 17 which may be slightly concave.

Figure 4:
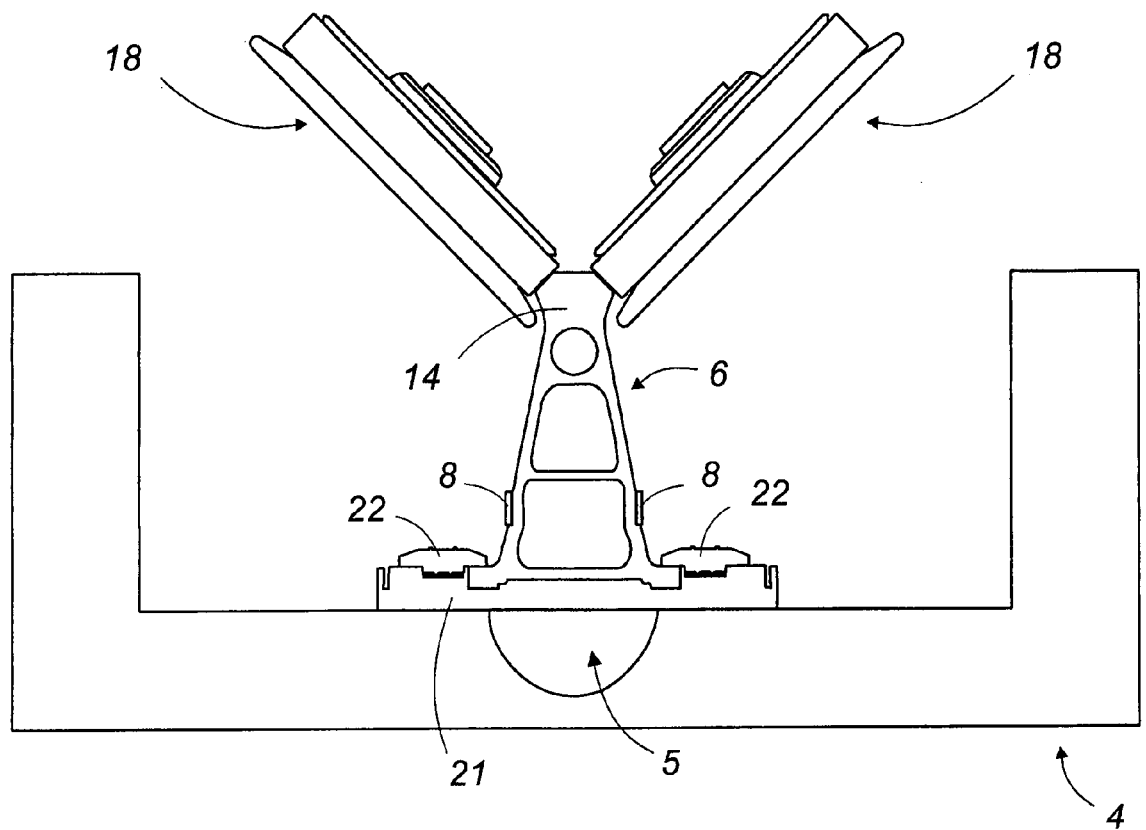
Figure 6:
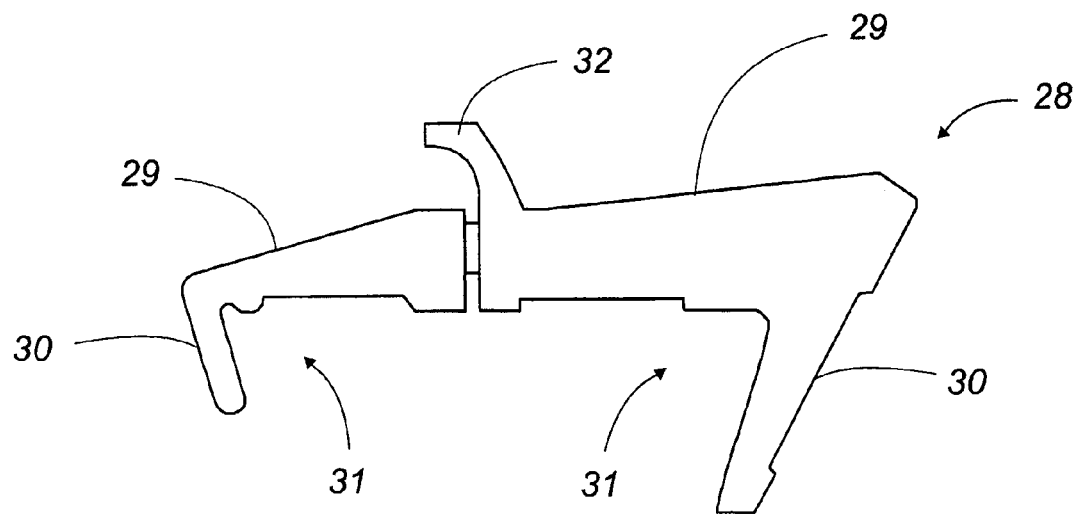
Figure 9:
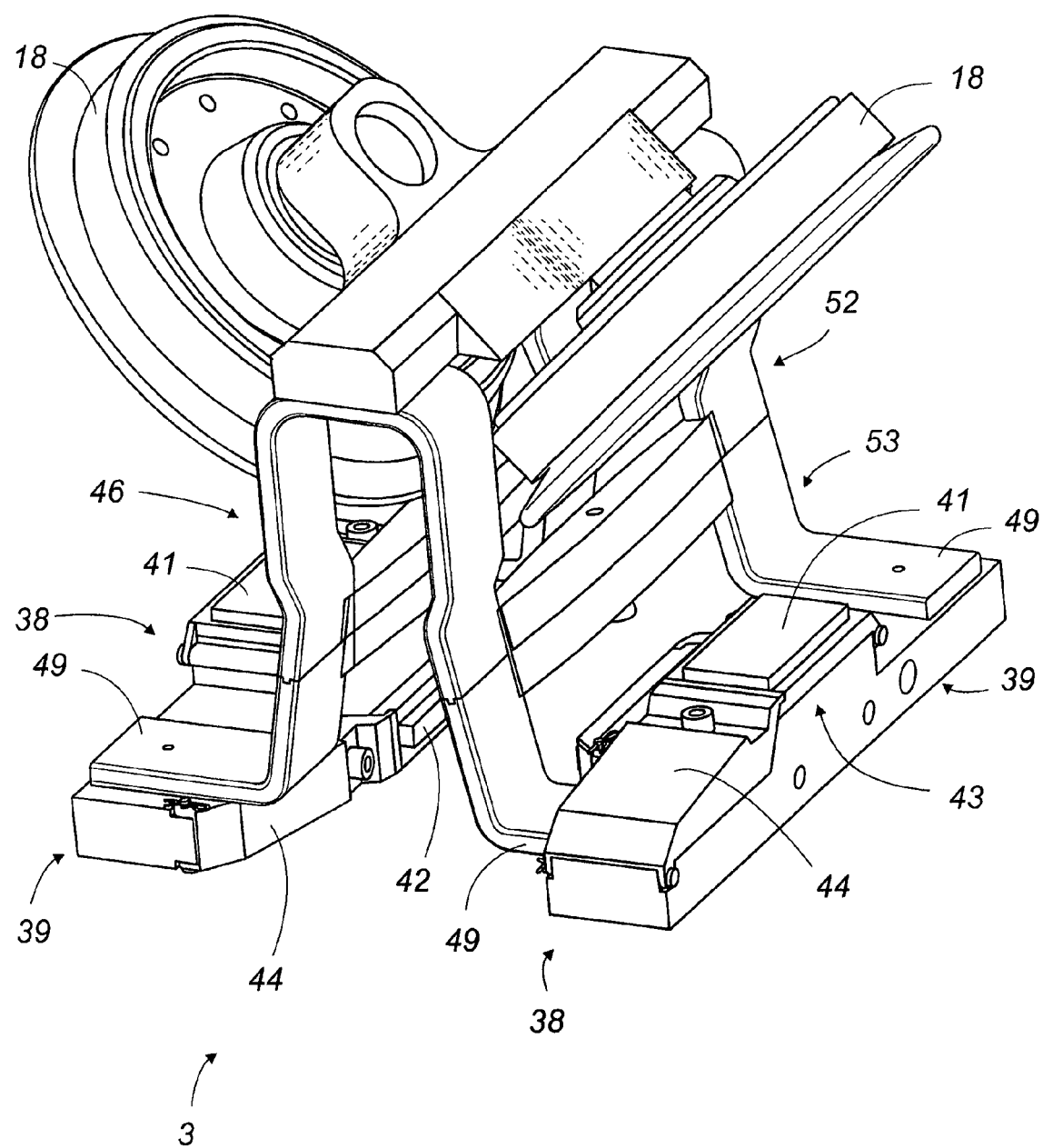
FIG. 9 is a perspective view of one example of the on-board current sensor according to the invention completed by a guide device.

It may also serve as a guide rail for a vehicle guide assembly or sensor arm which, as shown in FIGS. 4 and 9, may comprise two guide wheels 18 angled in a V shaped moving along the two corresponding angled surfaces 16 of the head 14 of the rail 6.

Toward the bottom, body 9 of rail 6 preferably terminates in a broad base 19 allowing a longitudinal contact edge 20 to extend on either side in order to anchor it to the base of cable duct 4.

Rail 6 is immobilized within the base of cable duct 4 by the cross pieces 21 disposed at regular intervals, for example, every 0.80 m and using of gripping elements 22, called clamps, bolted to the cross pieces.

At the level of each lateral extremity 23 of these cross pieces 21 the lower extremity 24 of a side profile 25 is immobilized using a clips.

The two side profiles 25 laterally define the electrical current supply device. Their exterior surface is set in the concrete. These side profiles 25 may be made of a very low charged, pultruded plastic material, for example.

As previously mentioned, current supply device 2 of the invention comprises at least one, but preferably two, supply wires 7 located within cable duct 4 on either side of rail 6 and at a distance therefrom.

These wires 7 preferably are symmetrical and generally trapezoidal in section and may be made from any suitable conductive material, such as stainless steel, aluminum or copper, for example.

In the situation where they are connected to a very low voltage (+60 volts or −60 volts), supply wires 7 are subjected to a high amp current. Therefore they must have a relatively large surface cross section. For reasons of weight and cost, the use of aluminum would be favored for manufacturing these lines.

To ensure good contact conditions between the contactors on the current sensor device 3 and supply wires 7, the corresponding surface of the latter is preferably covered with a thin contact plate of stainless steel 26, for example, about 1 millimeter thick. In the preferred example shown, this contact plate 26 is attached to the flat lower surface 27 of each of the supply wires 7.

Figure 8:
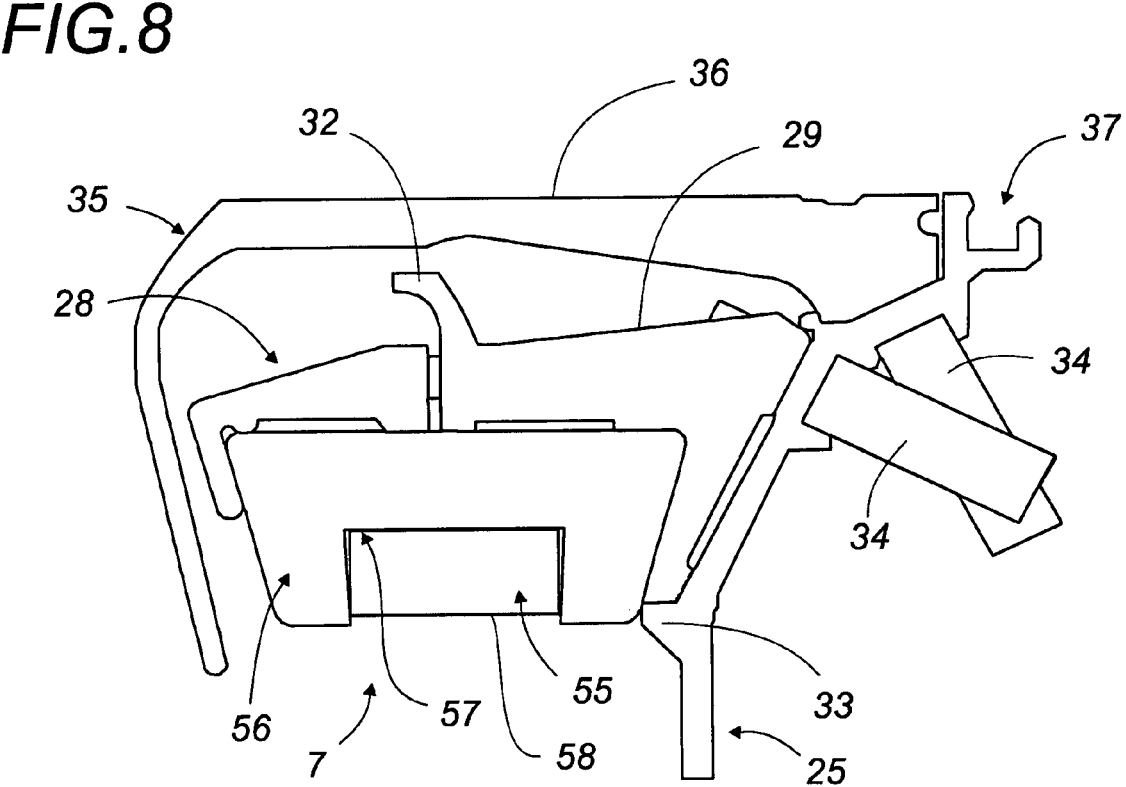

As shown in FIG. 8, the supply wire 7 is not necessarily a line made of a single piece. In a situation where a smaller surface section is sufficient, the supply wire 7 may be formed of a conductive linear web 55 housed in an insulating support 56 which may be trapezoidal in cross section, for example.

Insulating support 56 comprises, in the lower portion, a receptor groove 57 to which conductive linear web 55 is securely attached and maintained in place. The lower flat surface 58 of conductive linear web 55 remains free and is preferably slightly retracted inside insulating support 56.

The supply wires 7 are supported by a series of brackets 28 from which they are suspended. Each of these brackets 28 preferably comprises an upper wall 29 extending downward, near its lateral edges, into two lateral walls 30 assuming the shape of the upper portion of the supply wire 7 or of the corresponding insulating support 56.

At least one, and preferably each one of these brackets 28, may be formed of two right-angled pieces 31 that are placed on either side of wire 7, then reconnected at the level of their upper wall 29 and tightly connected so as to grip and maintain wire 7 or its insulating support 56.

Bracket 28 also preferably comprises an upper heel 32 projecting upward, the function of which will be described below.

Brackets 28 are positioned at intervals. The are spaced at about 800 m apart, for example, but they may located closer together and more regularly, especially on curves.

Figure 7:
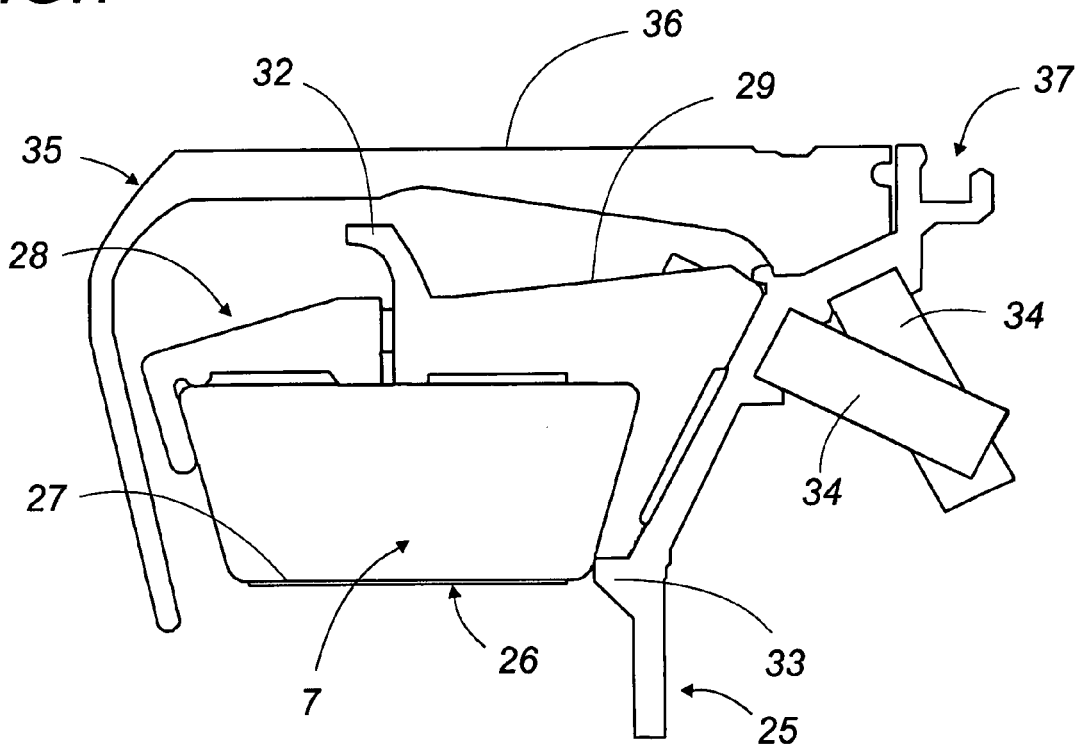

As can be seen in FIGS. 7 and 8, brackets 28 rest on a contact rib 33 on side profile 25 and may be affixed to it with screws 34 and nuts set into the concrete.

A protective profile 35 is attached to at least one and preferably to each side profile 25. This attachment may be made at the level of the upper extremity of each side profile 25 in which the extremity of the protective profile 35 engages, which is preferably also attached by screws 34 and nuts set into the concrete.

This protective profile 35 preferably has a generally flattened L-shape and surrounds supply wire 7 placed below it.

Its presence prevents any possible contact between users and live wire 7, ensuring complete safety. In addition, it prevents any undesirable penetration by objects, tools, debris or the like, either accidental or malicious, into the current supply system of the invention. It also protects the unit from weather.

The architecture of the unit described above is designed so that each supply wire 7 is completely masked by L-shaped protective profile 35, which makes it inaccessible. This feature, in combination with the use of low voltage, makes the electrical supply system of the invention a completely safe system.

Protective profile 35 preferably has an upper surface 36 that slopes slightly toward the exterior to allow rainwater to flow toward the corresponding bank forming the gutter. An intermediate seal, not shown, attached to either side in a longitudinal end groove 37 of side profile 25 forms a watertight separation.

Advantageously, a space exists between the rail 6 and the protective profile 35 to allow water and foreign objects, for example, debris or small objects, to be evacuated toward the base of cable duct 4.

To prevent jamming, if there is no cross piece 21, the existing space between the base 19 of the rail 6 and the lower extremity 24 of side profile 25 is larger in size than the space between the rail 6 and the protective profile 35.

The protective profiles 35 must be resistant enough to support the weight of another electric vehicle at intersections or to allow ordinary vehicles, pedestrians, cyclists or motorcyclists to pass over them at intersections and passages at that level formed by conventional traffic routes.

Since these profiles are slightly flexible, the projecting upper heel 32 on certain brackets or each wire-supporting bracket 28 forms a contact stop for the profile, as can be seen in FIG. 7, for the purpose of stress recovery if there is significant deformation.

The structure described above is continuous. As far as brackets 28 are concerned, they may be individual, that is, in the form of one piece that is repeated at intervals. Side profile 25 itself is continuous, but is attached to inserts submerged in the concrete and spaced at regular intervals.

Figure 10:
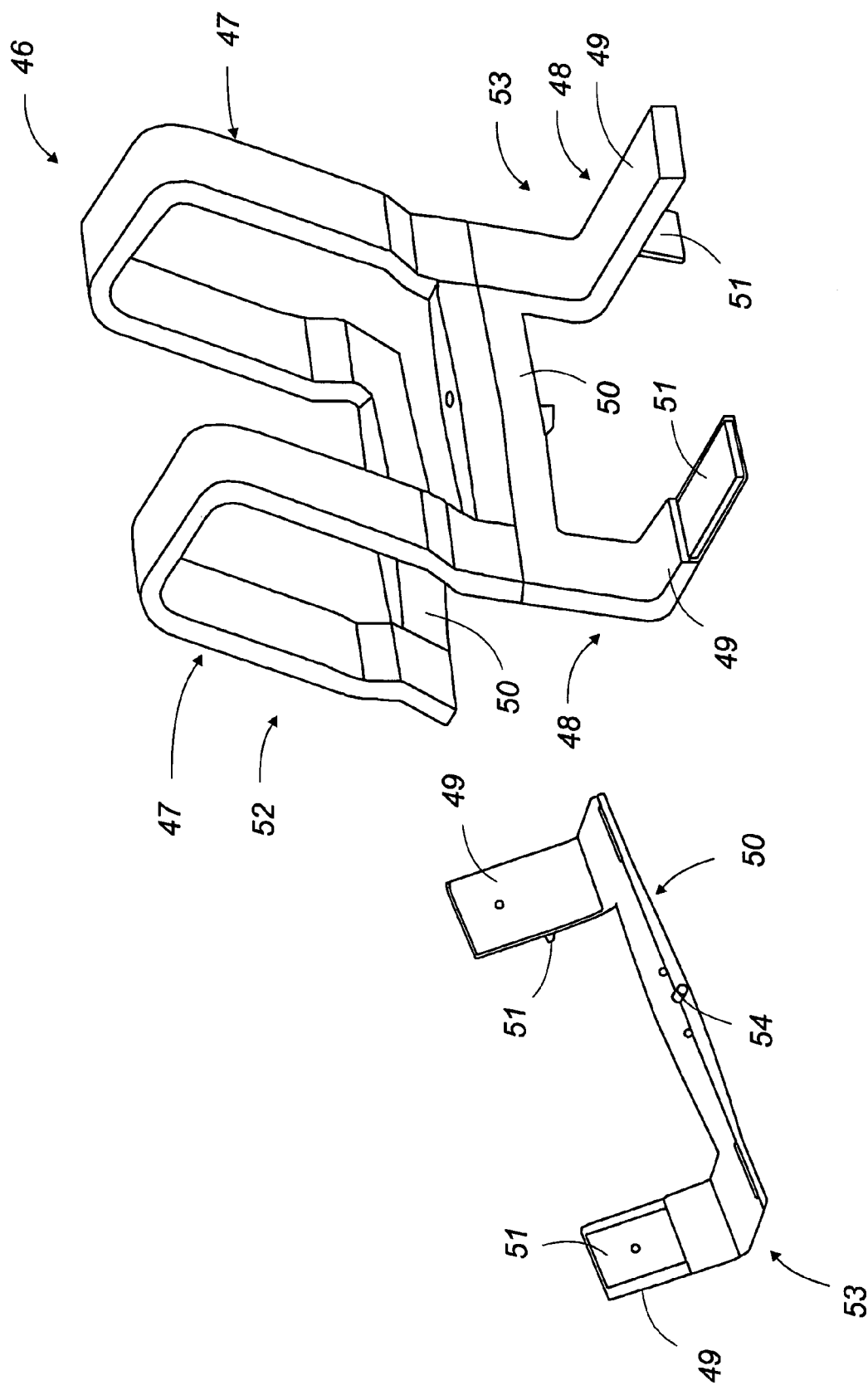
FIG. 10 is a perspective of a support unit according to the variation in FIG. 9, with one of its connecting elements being separated from the interface element.
Figure 11:
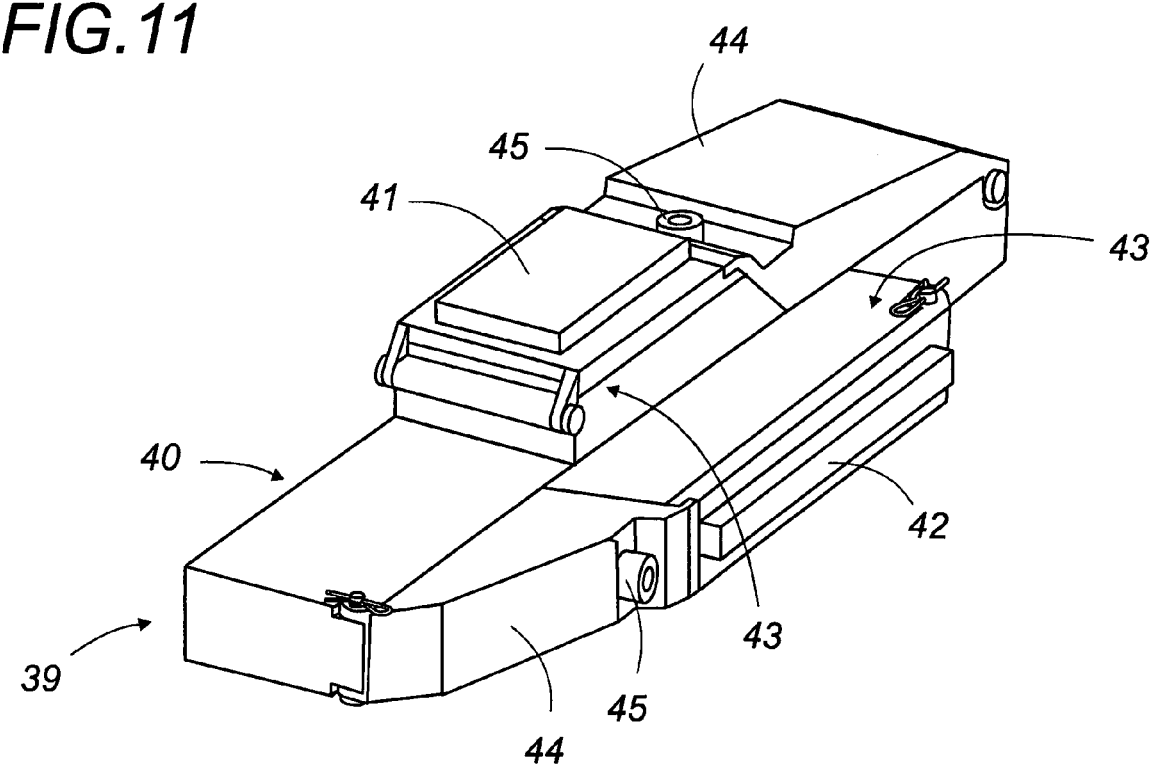
FIGS. 11 and 12 are perspective views of two sliding sensors designed to be attached to the support unit of FIG. 10 and located on either side of the central rail.

A more detailed description of the current sensor located on the vehicle follows, which is illustrated by FIGS. 9 through 11.

Collecting the electrical energy necessary to operate the utility circuits of the vehicle is accomplished using at least one, and preferably two, movable subassembly sensors 38, which may be symmetrical and which circulate inside cable duct 4 on either side of rail 6.

Figure 12:
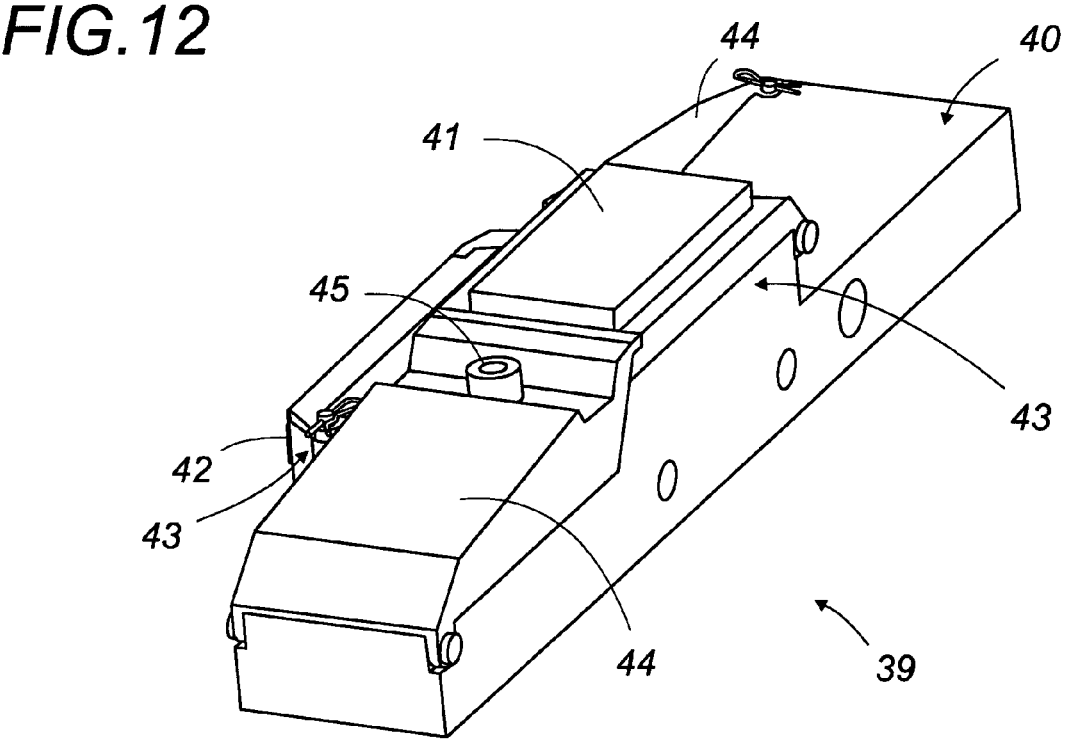

The principal portion of each sensor subassembly 38 is a sensor shoe 39 shown in perspective in FIGS. 11 and 12. The two sensor shoes 39 are preferably identical, the position of one shoe simply being reversed relative to the other one.

In the preferred embodiment shown, each shoe 39 has an elongated body 40 and comprises in the central position an essentially horizontal power contactor 41 designed for sliding contact with subsurface 27 or 58, preferentially covered with contact plate 26, of the corresponding supply wire 7.

Obviously this power contactor 41 can be elastically recalled from contact with supply wire 7 so as to ensure satisfactory electrical contact in any circumstance.

Advantageously, during operation the contact between power contactor 41 and supply wire 7 takes place below flattened L-shaped protective profile 35 and is surrounded by the return of this protective profile.

Each sensor shoe 39 also comprises, on the side that will be facing the rail 6, a zero volt contactor 42 disposed to be and to remain in sliding electrical contact on the corresponding zero volt reset conductor strip 8 supported by the rail 6. These contactors 42 may also be capable of elastic recall from contact with corresponding strip 8.

Power contractors 41 and zero volt contactors 42 are made of electrically conductive material. The body 40 of sensor shoes 39, made of electrically insulating material, ensures electrical insulation between the two contactors.

Advantageously, body 40 of sensor shoe 39 may also integrate shock absorbers 43, which may be formed of a case surrounding each contactor and its spring.

Each one of the power contactors 41 and zero volt reset contactors 42 is electrically connected to a conductive supply strip so that it can be electrically connected to the vehicle A protective cover 44 integrating a quick connection device for the electrical contactors may advantageously maintain each contactor in position. Preferably, and in order to facilitate maintenance, the contactors and their electrical connections may be removed, specifically for replacement, by unscrewing a single screw 45 that is connected with cover 44.

The two sensor shoes 39 are supported and mechanically connected by a support unit 46 preferably attached to the vehicle guide arm to provide dynamic stability.

Support unit 46, shown in FIG. 9, comprises two support arms 47 generally shaped like an inverted U, whose free extremities 48, located near the bottom and preferably curved outwardly, form attaching plates 49 for attaching sensor shoes 39.

The two U-shaped support arms 47 form the front and rear portion of the support unit 46. They are connected by two lateral reinforcing bars 50, preferably generally horizontal, joining on each side the corresponding lateral branches of the two U-shaped support arms 47.

Support unit 46 fulfills two functions.

On the one hand, it supports sensor subassemblies 38 inside the cable duct and on the other hand, it ensures the electrical connection between these sensor subassemblies 38 and the utility circuits in the vehicles.

The latter function is preferably achieved using copper bars submerged in an armature made of composite material forming support arms 47 and ensuring that the bars are electrically insulated.

Each of the sensor shoes 39 is attached, at the front and the back, to support unit 46 using two attaching plates 49 each belonging to a different support arm 47.

One of the attaching plates 49 is electrically connected to electrical contactor 41 allows current to be transmitted to the vehicle's utility circuit, for example, through the lateral branch of corresponding support arm 47. The other plate 49 is electrically connected to zero volt contactor 42 to allow zero volt resetting, for example, through the lateral branch of corresponding support arm 47.

In the realm of normal vehicle operation, the system for the ground power supply, according to the invention, provides for sensor subassemblies 38 to be inserted in cable duct 4 in the sensor position at the beginning of the line and to leave it only at the end of the line.

However, for reasons of safety and quick intervention and disengagement, the system of the invention allows subassemblies 38 to be disconnected and support unit 46 to be extracted while on line, for example, if there is a breakdown, an accident, or any type of problem.

Advantageously, this separation while on line may be accomplished if there is a serious breakdown threatening passenger safety without damaging the other elements present in the cable duct. Furthermore, it ensures that elements outside the cable duct are disconnected from the electrical source.

For this purpose, and as shown in FIG. 9, support assembly 46 can be longitudinally disconnected at the level of lateral reinforcing bars 50. It can also be split into an upper interface piece 52 and at least one, preferably two, lower connection pieces 53. Upper interface piece 52 preferably extends on each of its sides into a lower connecting piece 53, each terminating in two connection plates 49.

Preferably, the two connecting pieces 53 are identical and are generally U-shaped. They may be joined to upper interface piece 52 with a pin or shear screw 54 that yields to a predetermined amount of overhead pressure.

It is evident that the invention is not limited to the preferred modes of embodiment described above and shown in the different drawings, since a person skilled in the art could make numerous modifications and conceive of other variations without departing from the scope and context of the invention.

The invention claimed is:

1. A ground power supply system (1), for a land vehicle traveling along a predetermined course, comprising a ground electrical supply system for achieving sliding contact with at least one conductive element, the system comprising a device (2) located on the ground for supplying electrical current and a current sensing device (3) attached to and moving with the vehicle, wherein the electrical current supply device (2) is located in a cable duct (4) that is open at a top and includes at least one supply wire (7) connected to an electrical voltage source, the at least one wire (7) is laterally located in the cable duct (4), relative to a rail (6) that supports at least one zero volt reset conductor strip (8), and further comprises at least one protective profile (35) having an L-shape which at least partially covers the at least one supply wire (7) located beneath the at least one protective profile (35), an end of a horizontal longer side of the L-shaped protective profile (35) being attached to an upper end of the electrical current supply device (2) while a substantially vertical shorter side of the L-shaped protective profile (35) extending downwardly for at least partially protecting the at least one supply wire (7);

the current sensing device (3) comprises at least one movable sensor subassembly (38) supported by a support unit (46) that moves inside the cable duct (4) laterally relative to the rail (6), the at least one sensor subassembly (38) comprising a power contactor (41) positionable under the at least one supply wire (7) for forming a sliding electrical contact with the at least one supply wire (7) and a zero volt contactor (42) forming a sliding electrical contact with the at least one zero volt reset conductor strip (8), the power contactor (41) and the zero volt reset contactor (42) are electrically connected to at least one utility circuit of the vehicle; and the contact between the power contactor (41) and the at least one supply wire (7) occurs below the at least one protective profile (35) and is laterally covered by a return of the at least one protective profile (35).

2. The ground electrical supply system according to claim 1 wherein the at least one supply wire (7) is connected to a continuous electrical voltage source.

3. The ground electrical supply system according to claim 1 wherein the electrical current supply device (2) comprises first and second supply wires (7) each connected to an electrical voltage source, the first and the second wires (7) are located in the cable duct (4), on either side of the rail (6) that supports first and second zero volt reset conductor strips (8), and comprises first and second protective profiles (35) each having a generally flattened L shape, each of the first and the second protective profiles (35) at least partially covers a superior side and a lateral side of one of the first and the second supply wires (7) located beneath the respective protective profile (35);

the current sensing device (3) comprises first and second movable sensor subassemblies (38) supported by a support unit (46) that moves inside the cable duct (4) on either side of the rail (6), each of the first and the second sensor subassemblies (38) comprises a power contactor (41) positionable under the corresponding supply wire (7) and forming a sliding electrical contact with an inferior side of the corresponding supply wire (7) and a zero volt contactor (42) forming a sliding electrical contact with the corresponding zero volt reset conductor strip (8), the power contactor (41) and zero volt contactor (42) are electrically connected to the at least one utility circuit of the vehicle, and the contact between each power contactor (41) and the inferior side of the corresponding supply wire (7) takes place below the corresponding protective profile (35) and is partially laterally covered by the return of this protective profile (35).

4. The ground electrical supply system according to claim 3 wherein the first and second supply wires (7) are each connected to a continuous low voltage source with the first wire connected to a positive source and the second wire connected to a negative source.

5. The ground electrical supply system according to claim 4 wherein the voltage supply furnished by the first and the second supply wires (7) is +60 volts for the first wire and −60 volts for the second wire.

6. The ground electrical supply system according to claim 1 wherein the voltage supply furnished by the at least one supply wire (7) is a high drive voltage.

7. The ground electrical supply system according to claim 6 wherein the high drive voltage is approximately 750 volts.

8. The ground electrical supply system according to claim 1 wherein the cable duct (4) is a concrete cable duct which has a generally rectangular transverse cross section and which is buried in a trench of a ground surface in such a way that the top of the cable duct is generally level with the ground surface.

9. The ground electrical supply system according to claim 1 wherein a central collecting line (5) and two gutters run along and border the cable duct for draining an interior space of the cable duct (4).

10. The ground electrical supply system according to claim 1 wherein the rail (6) serves as a guide rail for the vehicle.

11. The ground electrical supply system according to claim 1 wherein the rail (6) is made of an electrically insulating material.

12. The ground electrical supply system according to claim 1 wherein the at least one zero volt reset conductor strip (8) is made of steel.

13. The ground electrical supply system according to claim 3 wherein the first and the second zero volt reset conductor strips (8) are arranged symmetrical and generally vertical.

14. The ground electrical supply system according to claim 1 wherein the rail (6) is immobilized to a base of the cable duct (4) by cross pieces (21) disposed at regular intervals along a length of the cable duct (4).

15. The ground electrical supply system according to claim 1 wherein first and second side profiles (25) laterally define the ground current supply device (2).

16. The ground electrical supply system according to claim 14 wherein the ground current device (2) is laterally by first and second side profiles (25) which are made of plastic material and are immobilized by clipping lower extremity (24) thereof at the level of the corresponding lateral extremity (23) of the cross pieces (21).

17. The ground electrical supply system according to claim 1 wherein the at least one supply wire (7) is made of aluminum.

18. The ground electrical supply system according to claim 17 wherein the contact surface of the at least one supply wire (7) is covered by a contact plate (26) made of stainless steel.

19. The ground electrical supply system according to claim 1 wherein the at least one supply wire (7) is formed of a linear conductive web (55) embedded in an insulating support (56).

20. The ground electrical supply system according to claim 1 wherein the at least one supply wire (7) is supported by a series of brackets (28) from which the at least one supply wire (7) suspended.

21. The ground electrical supply system according to claim 20 wherein at least one of the brackets (28) is formed of two right-angled pieces (31) placed on either side of the at least one wire (7), then rejoined and assembled at a level of an upper wall (29) so as to support the at least one wire (7).

22. The ground electrical supply system according to claim 15 wherein the at least one supply wire (7) is supported by a series of brackets (28) from which the at least one supply wire (7) is suspended and the brackets (28) are attached to the side profile (25) and located at spaced intervals along a length of the cable duct (4).

23. The ground electrical supply system according to claim 15 wherein the at least one protective profile (35) is attached to one of the first and the second side profiles (25).

24. The ground electrical supply system according to claim 1 wherein the at least one protective profile (35) has an upper surface (36) that slopes slightly outward.

25. The ground electrical supply system according claim 20 wherein at least one of the brackets (28) comprises an upper heel (32) projecting upward and forming a contact stop for the at least one protective profile (35).

26. The ground electrical supply system according claim 1 wherein a space exists between the rail (6) and the at least one protective profile (35) that is used to evacuate water and foreign objects toward a bottom of the cable duct (4).

27. The ground electrical supply system according to claim 1 wherein in the at least one sensor subassembly (38), the power contactor (41) and the zero volt contactor (42) are joined to a sensor shoe (39).

28. The ground electrical supply system according to claim 3 wherein, in the first sensor subassembly (38), the power contactor (41) and the zero volt contactor (42) are joined to a first sensor shoe (39) and, in the second sensor subassembly (38), the power contactor (41) and the zero volt contactor (42) are joined to a second sensor shoe (39), and the first and second sensor shoes (39) are arranged in a reverse position relative to one another.

29. The ground electrical supply system according to claim 1 wherein at least one of the power contactor (41) and the zero volt contactor (42) is attached so that the contact can be elastically recalled from engagement with a corresponding at least one supply wire (7) or a corresponding at least one conductive strip (8).

30. The ground electrical supply system according to claim 1 wherein at least one of the power contactor (41) and the zero volt contactor (42) has a shock absorber (43).

31. The ground electrical supply system according to claim 1 wherein the support unit (46) is attached to a guide arm of the vehicle.

32. The ground electrical supply system according to claim 1 wherein the support unit (46) includes two copper bars (51) submerged in an armature of composite material for ensuring that the bars are electrically insulated.

33. The ground electrical supply system according to claim 28 wherein the support unit (46) comprises two support arms (47) generally shaped as an inverted U, lateral branches of the support unit (46) are joined by reinforcing lateral bars (50), and free extremities (48) of the support arms (47) constitute attachment plates (49) for attaching the first and the second sensor shoes (39) thereto.

34. The ground electrical supply system according to claim 1 wherein the at least one sensor subassembly (38) is disconnectable and, when disconnected, allows the support assembly (46) to be extracted.

35. The ground electrical supply system according to claim 34 wherein the support assembly (46) is separatable into an upper interface piece (52) and at least one lower connecting piece (53).

36. The ground electrical supply system according to claim 35 wherein the at least one lower connecting piece (53) is joined to the upper interface piece (52) using one of a shear pin and a shear screw (54) which yield at a predetermined amount of pressure.

* * * * *